United States Patent
Kim et al.

(10) Patent No.: US 9,020,530 B2
(45) Date of Patent: *Apr. 28, 2015

(54) LOCATION TRACKING OF MOBILE PHONE USING GPS FUNCTION

(75) Inventors: Jonghae Kim, Fishkill, NY (US); Moon J. Kim, Wappingers Falls, NY (US); Jean-Oliver Plouchart, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 613 days.

This patent is subject to a terminal disclaimer.

(21) Appl. No.: 13/347,989

(22) Filed: Jan. 11, 2012

(65) Prior Publication Data
US 2012/0108210 A1 May 3, 2012

Related U.S. Application Data

(63) Continuation of application No. 11/689,653, filed on Mar. 22, 2007, now Pat. No. 8,121,620.

(51) Int. Cl.
*G01S 5/00* (2006.01)
*H04W 64/00* (2009.01)
*G01S 5/10* (2006.01)

(52) U.S. Cl.
CPC ............ *G01S 5/0036* (2013.01); *G01S 5/10* (2013.01); *H04W 64/00* (2013.01); *G01S 2205/002* (2013.01); *G01S 2205/008* (2013.01)

(58) Field of Classification Search
CPC ......... H04W 4/02; H04W 64/00; H04W 4/21; H04W 12/06; H04W 12/08; H04W 48/04; G01S 5/27; G01S 5/10; G01S 19/42; H04M 2250/10; H04M 1/663; G08B 13/2462; G08B 21/0202

USPC ............... 455/410, 411, 456.1, 456.2, 456.3, 455/456.6

See application file for complete search history.

(56) References Cited

U.S. PATENT DOCUMENTS

| | | | |
|---|---|---|---|
| 5,873,040 | A | 2/1999 | Dunn et al. |
| 6,677,895 | B1 | 1/2004 | Holt |

(Continued)

FOREIGN PATENT DOCUMENTS

| | | |
|---|---|---|
| JP | 11038115 A | 2/1999 |
| JP | 2003052064 A | 2/2003 |

OTHER PUBLICATIONS

"New Mobile Phone Emergency Locator Based on PTV's Tracking & Tracing Platform", Sep. 1, 2006, Media Limited, URL: http://www.roadtraffic-technology.com/contractors/it/ptv/press1.html.

(Continued)

*Primary Examiner* — Nizar Sivji
(74) *Attorney, Agent, or Firm* — Lisa Ulrich; Hoffman Warnick LLC (57) ABSTRACT

A system, method, service and mobile device are disclosed for providing a location of the mobile device. The invention utilizes a mobile phone with a global positioning system (GPS) module which is located in a wireless network. A third party device is able to submit a location query to a mobile telephone service operator (MTSO). This location query includes the mobile phone's telephone number. Using the telephone number, the MTSO determines the base station with which the mobile phone is associated. The location query is then forwarded to the mobile phone via the base station. The mobile phone collects the GPS data from the GPS module and forwards the GPS data to the base station. The base station converts the GPS data to location information and forwards the location information to the third party device via the MTSO.

17 Claims, 6 Drawing Sheets

(56) References Cited

U.S. PATENT DOCUMENTS

| | | | |
|---|---|---|---|
| 6,813,498 B1* | 11/2004 | Durga et al. | 455/456.1 |
| 7,107,064 B2* | 9/2006 | Ito | 455/456.1 |
| 2002/0090956 A1 | 7/2002 | Otsuka et al. | |
| 2002/0127994 A1 | 9/2002 | Stanners | |
| 2003/0034914 A1 | 2/2003 | Schur | |
| 2003/0050077 A1 | 3/2003 | Takeuchi et al. | |
| 2004/0147272 A1 | 7/2004 | Shiota et al. | |
| 2004/0203601 A1* | 10/2004 | Morriss et al. | 455/411 |
| 2004/0203876 A1 | 10/2004 | Drawert et al. | |
| 2004/0203927 A1* | 10/2004 | Kraft | 455/456.2 |
| 2004/0266457 A1 | 12/2004 | Dupray | |
| 2005/0003834 A1 | 1/2005 | Hughes | |
| 2006/0166682 A1* | 7/2006 | Karaoguz et al. | 455/456.2 |
| 2006/0258370 A1* | 11/2006 | Sudit et al. | 455/456.1 |
| 2006/0276201 A1 | 12/2006 | Dupray | |
| 2007/0178915 A1* | 8/2007 | Khan | 455/457 |
| 2008/0045234 A1* | 2/2008 | Reed | 455/456.1 |
| 2008/0316091 A1 | 12/2008 | Wigren et al. | |

OTHER PUBLICATIONS

Choo, U.S. Appl. No. 11/689,653, Office Action Communication, Aug. 3, 2010, 17 pages.

Choo, U.S. Appl. No. 11/689,653, Office Action Communication, Dec. 14, 2010, 25 pages.

Choo, U.S. Appl. No. 11/689,653, Final Office Action Communication, Mar. 31, 2011, 23 pages.

Choo, U.S. Appl. No. 11/689,653, Notice of Allowance & Fees Due, Oct. 13, 2011, 13 pages.

\* cited by examiner

LOCATION TRACKING OF MOBILE PHONE USING GPS FUNCTION

CROSS-REFERENCE TO RELATED APPLICATIONS

This application is a continuation of co-pending U.S. patent application Ser. No. 11/689, 653, filed Mar. 22, 2007 now U.S. Pat. No. 8,121,620, to which the right of priority is hereby claimed, which is hereby incorporated herein.

TECHNICAL FIELD

The invention relates generally to location tracking, and more particularly to a system and method of providing location tracking of a mobile phone using a global positioning system (GPS).

BACKGROUND

For various reasons, it is often desirable to be able to locate a mobile phone. For example, the FCC (Federal Communication Commission) is now requiring wireless companies to accurately locate mobile 911 callers. Current location tracking methods provide a rough area in a cell at which the phone is located.

Figure 1:
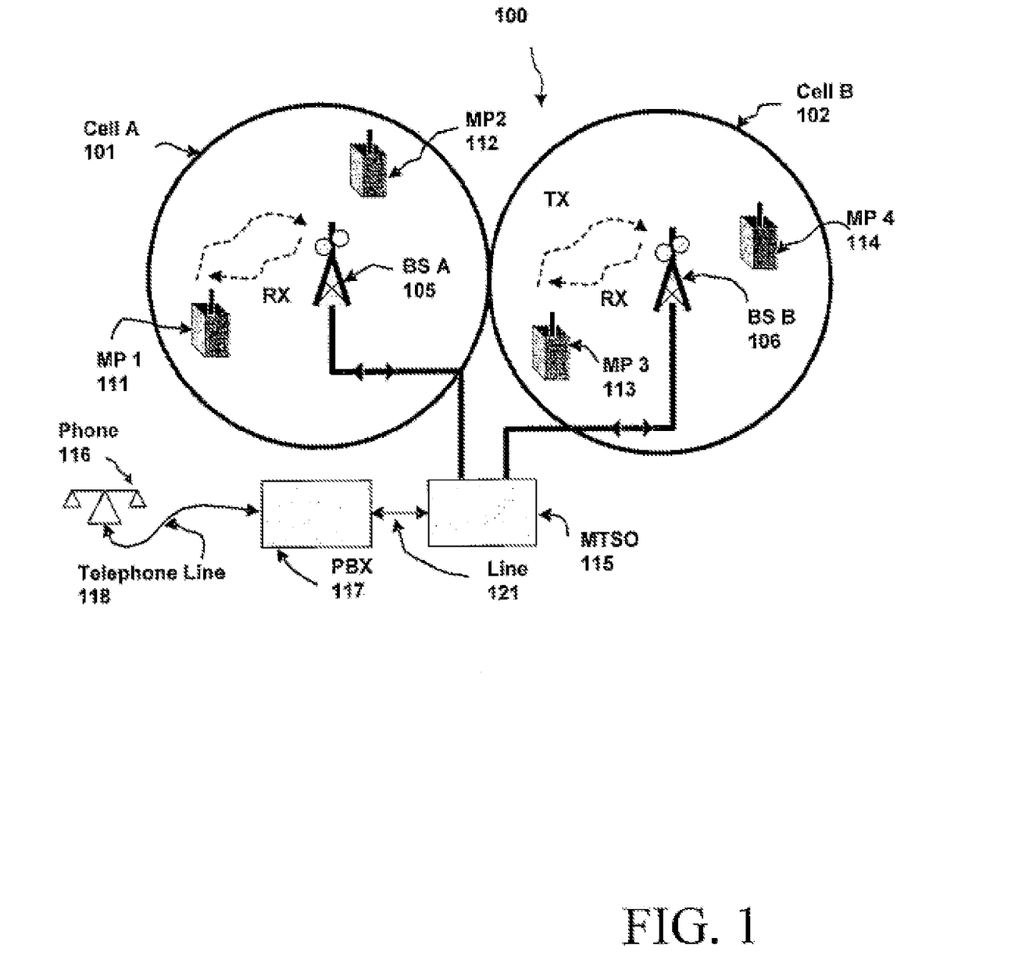
FIG. 1 depicts a wireless network.

FIG. 1 shows a wireless phone network 100 having mobile phones (MP) 111-114 located within cells 101 and 102. Each cell includes a base station 105, 106, and as the mobile phones 111-114 travel they communicate with a closest base station. Using current technology, when location information for a mobile phone is requested via third party telephone 116, a mobile telephone service operator (MTSO) 115 searches for the cell that includes mobile phone. The MTSO 115 then requests the location information of mobile phone from the base station associated with the cell.

When a mobile phone is in standby mode and the phone is not activated, the mobile phone regularly sends a supervisory signal to the base station. Thus, the base station knows all phone numbers that are located in its own cell. This is referred to as a mobile phone registration. A similar registration procedure occurs when a call is activated within a cell. This registration specification helps the MTSO 115 know the cell location of the mobile phone.

When the third party telephone 116, in any location (whether in the same cell or not), asks the location of a mobile phone to MTSO 115 (e.g., via telephone line 118, Private Branch Exchange (PBX) 117, and line 121, MTSO 115 can provide certain location information after MTSO 115 finds the registration cell. The base station tracks mobile phones in its cell by the received signal strength. The cell radius is typically one to three miles.

Figure 2:
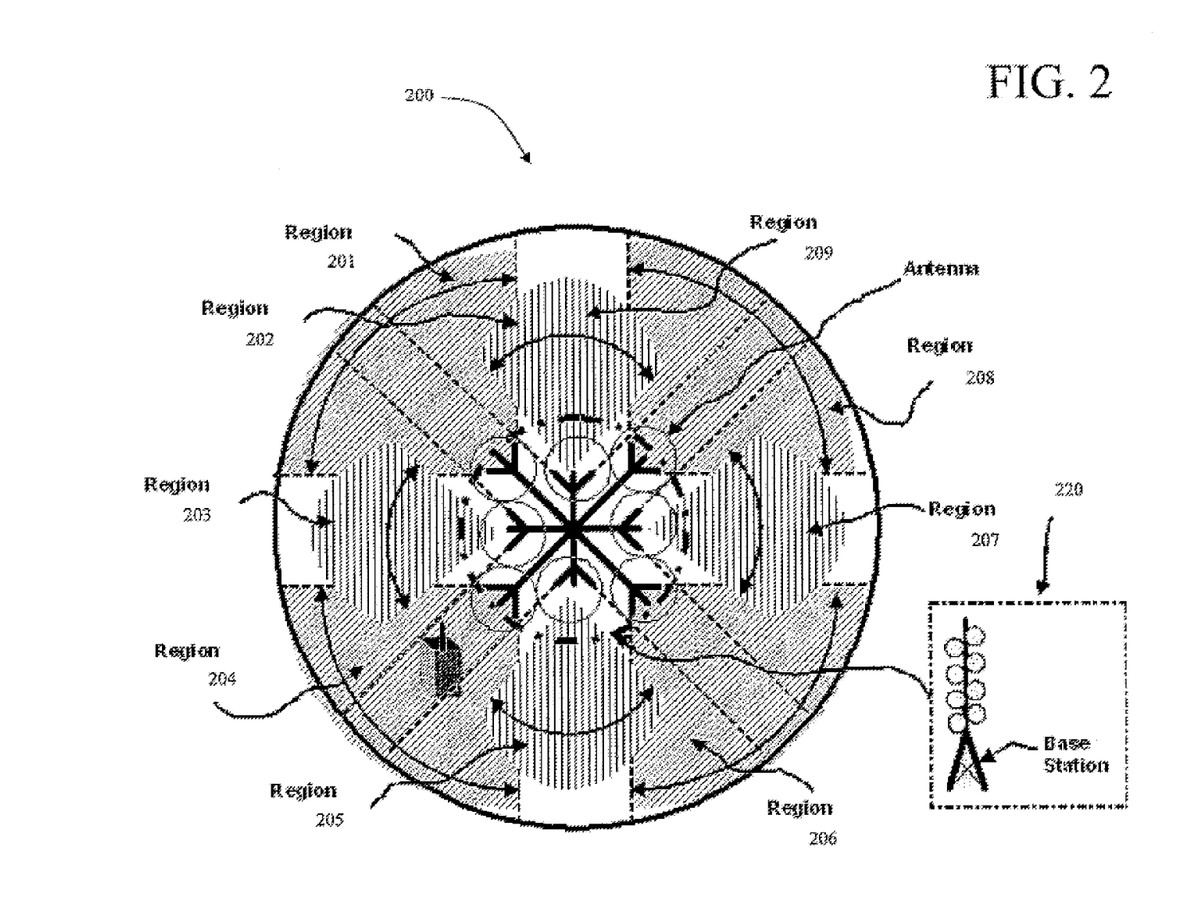
FIG. 2 depicts a cell having a plurality of regions.

As shown in FIG. 2, base station 220 has diversified antennas to communicate with mobile phones in the cell 200. The current location tracking methods can only provide a region 201-209 in the cell 200 of the location of the mobile phone. Current methods cannot provide a pinpoint location. Accordingly, a more granular location tracking method is needed.

SUMMARY

The present invention addresses the above-mentioned problems, as well as others, by providing a mobile phone device that includes a global positioning system (GPS) module. The GPS module allows the mobile phone device to be located by a third party device using a location query methodology described herein.

In a first aspect, the invention provides a method for locating a mobile phone in a wireless network, comprising: providing a mobile phone having a global positioning system (GPS) module, wherein the mobile phone is located in the wireless network; submitting a location query of the mobile phone from a third party device to a mobile telephone service operator (MTSO), wherein the location query includes a telephone number of the mobile phone; determining a base station to which the mobile phone is associated based on the telephone number provided in the location query; forwarding the location query to the mobile phone via the base station; collecting GPS data from the GPS module and forwarding the GPS data to the base station; converting the GPS data to location information; and forwarding the location information to the third party device via the MTSO.

In a second aspect, the invention provides a system for locating a mobile phone in a wireless network, comprising: a system for submitting a location query of the mobile phone from a third party device to a mobile telephone service operator (MTSO), wherein the location query includes a telephone number of the mobile phone; a system for determining a base station to which the mobile phone is associated based on the telephone number provided in the location query; a system for forwarding the location query to the mobile phone via the base station; a system for retrieving global positioning system (GPS) data from a module incorporated into the mobile phone; and a system for forwarding the GPS data to the third party device via the MTSO.

In a third aspect, the invention provides a mobile phone that is locatable within a wireless network, comprising: a global positioning system (GPS) module for obtaining GPS data; a system for receiving a location query from a base station and returning GPS data; and an interface for setting the mobile phone to either a reveal mode or a hidden mode, wherein the reveal mode will allow GPS data to be retrieved from the mobile phone and the hidden mode will block GPS data from being retrieved from the mobile phone.

In a fourth aspect, the invention provides a method for deploying a system for locating mobile phones in a wireless network, comprising: providing a computer infrastructure being operable to: receive a location query of a mobile phone from a third party device, wherein the location query includes a telephone number of the mobile phone; determine a base station to which the mobile phone is associated based on the telephone number provided in the location query; forward the location query to the mobile phone via the base station; retrieve global positioning system (GPS) data from a module incorporated into the mobile phone; and forward the GPS data to the third party device.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION

Figure 3:
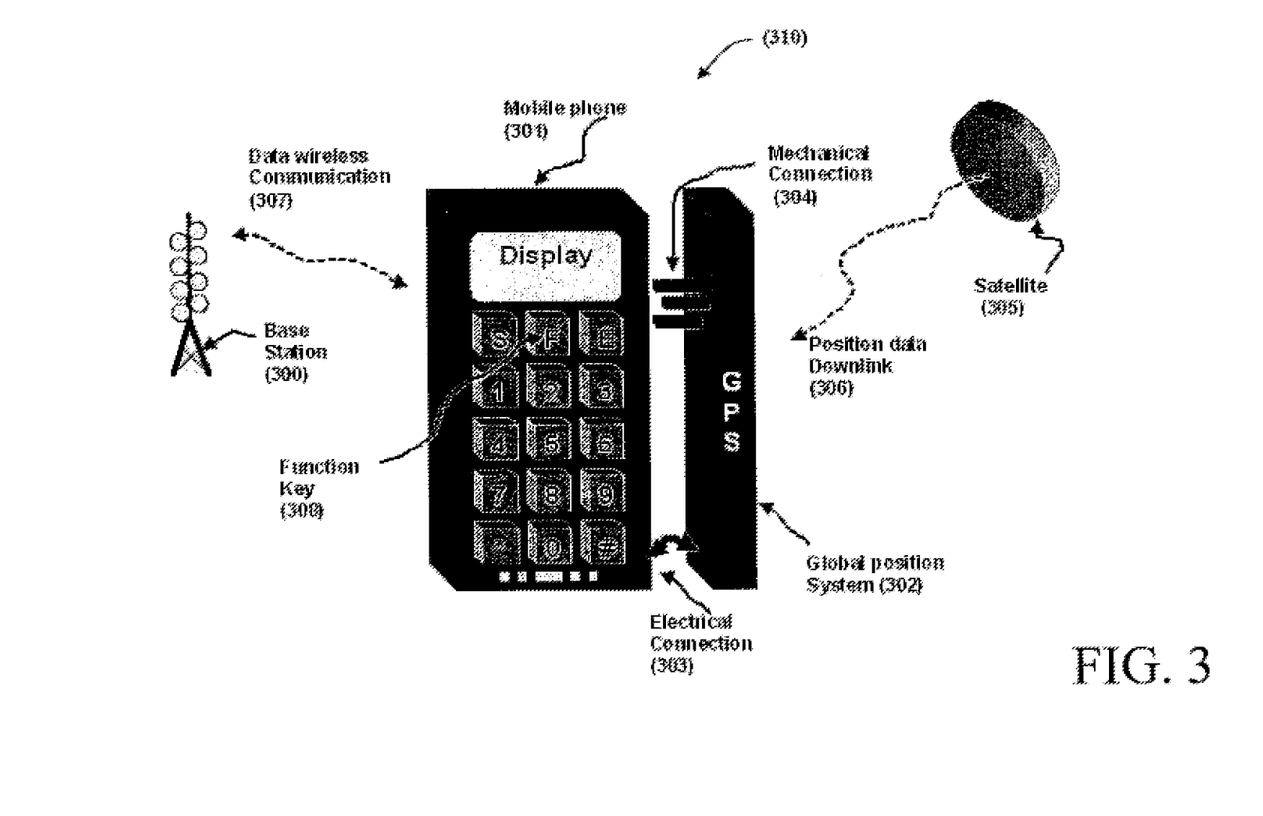
FIG. 3 depicts a mobile phone having a Global Positioning System (GPS) in accordance with an embodiment of the present invention.

In order to provide more granular location information, a mobile phone is provided that includes a Global Positioning System (GPS) module, and a query methodology is provided for locating the mobile phone. FIG. 3 depicts an embodiment of a mobile phone 310 that includes a phone module 301 and a GPS module 302. GPS module 302 is connected with phone module 301 via both mechanical and electrical connectors 303, 304. The GPS module 302 tracks the mobile phone's position information 306 from a GPS satellite system 305. The detected information 306 is then provided to the phone module 301. The phone module 301 collects the location information (either regularly or as needed) from the GPS module 302 and can send the base station 300 the location information via wireless communication channel 307 when a location query signal is detected from the base station 300. In addition, although shown as two separate connectable components, phone module 301 and GPS module 302 may be integrated into a single component.

As described in further detail below with regard to FIG. 8, phone module 301 includes location function settings 308 (e.g., a key or soft function process) that allows the user of the mobile phone 310 to control accessibility of the location features of mobile phone 310. In particular, mobile phone 310 may be set to a "reveal" mode or a "hidden/password" mode. In the reveal mode, any third party can submit a query to obtain the location of the mobile phone 310. In the hidden/password mode, third parties are blocked from obtaining the location of the mobile phone 310 unless the third party correctly provides a password associated with the mobile phone 310. In a typical embodiment, the owner of the mobile phone 310 selects and enters a password that is stored on the mobile phone 310 via location function settings 308. In one illustrative application, a child's phone could be set to the hidden/password mode to allow a parent with the password to readily obtain the location of their child, whereas third parties without the password would be blocked.

Figure 4:
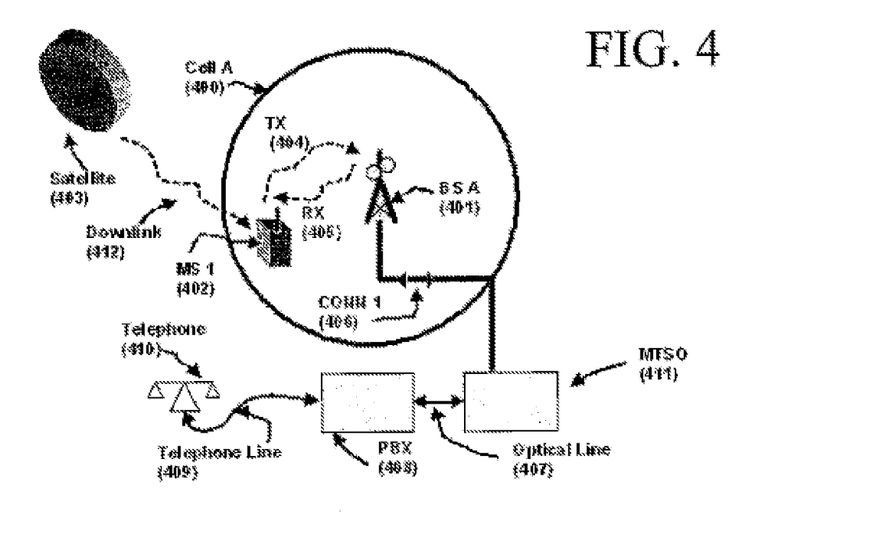
FIGS. 4-6 depict wireless networks that incorporate location methodologies in accordance with embodiments of the present invention.

FIG. 4 provides a schematic of a wireless network utilized to locate a mobile phone 402 from a third party telephone 410. In this case, third party telephone 410 is a land-based device, which is utilized to initiate a location query. In a typical embodiment, the location query is initiated by first dialing a predefined number associated with a query system or service provider. Once into the query system, the user can then enter the number (and optionally the password) of the mobile phone they would like to locate.

When a location query for the mobile phone 402 is requested by telephone 410, the query signal is delivered to a telephone exchange (PBX) 408 via a telephone line 409. PBX 408 then sends a query signal to MTSO 411 through, e.g., an optical line 407, and MTSO 411 sends the request to the base station 401 via optical link 406. The base station 401 then transmits the location query to the mobile phone 402 in the cell 400.

Location information is provided to GPS module in the mobile phone 402 from satellite system 403 via downlink 412. When mobile phone 402 receives a location query signal from the base station 401 via link 405, mobile phone 402 decides whether or not to provide the location information back to base station 401 via link 404 based on the settings stored in the device 402.

As noted, there are at least two setting modes for the mobile phone device 402, which include a "reveal mode" and a "hidden/password mode". The reveal mode allows the location information of the device 402 to be provided back to base station 401 when a query is received and hidden/password mode does not allow the location information to be retrieved unless a correct password is provided.

If the phone is set to reveal mode or a proper password is provided in hidden/password mode, the location information is sent to base station 401, after which it is converted into a detailed address (e.g., "800 Street, City NY 00000") using, e.g., an address table that converts the retrieved GPS codes. The address information is then delivered to the requester via the reverse path. However, when the device is set the hidden mode and a proper password is not provided, an "UNAVAILABLE" signal or the like is delivered.

Figure 5:
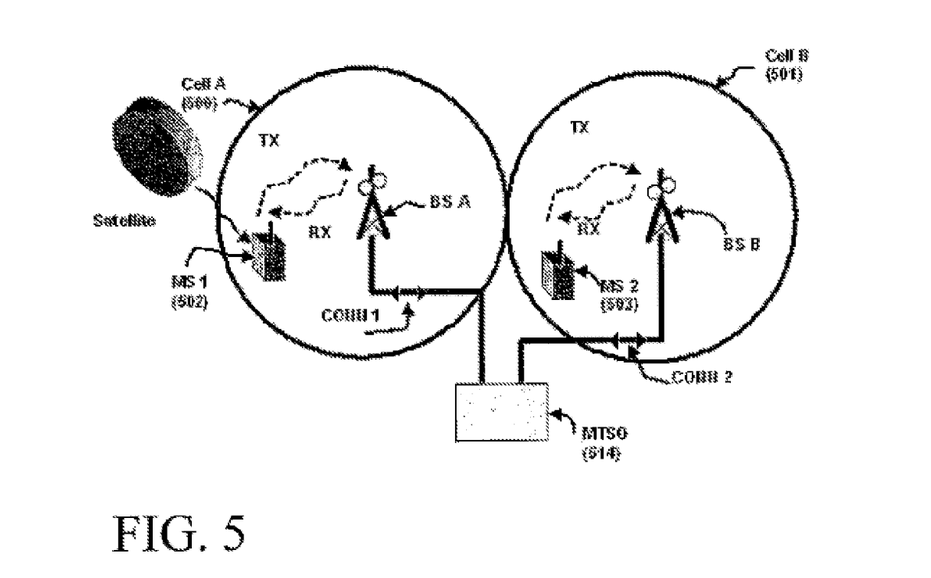

FIG. 5 depicts a slight variation in which a mobile phone device 503 in a first cell 501 submits a location query for a mobile phone device 502 in a second cell 500. In this case, the MTSO 514 can just operate between two cells to communicate the location information; otherwise, the functionality is similar to the embodiment provided in FIG. 4.

Figure 6:
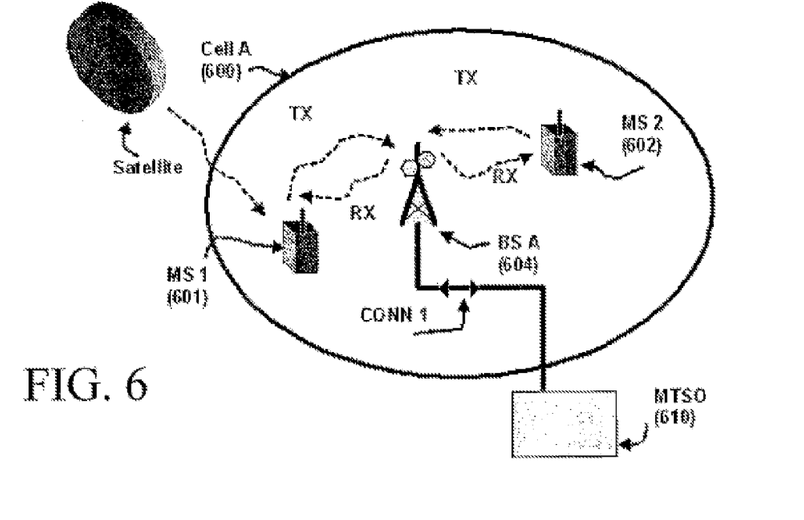

FIG. 6 depicts a further variation in which a first mobile phone device 602, residing in the same cell 600 as a second mobile phone device 601, submits a location query for the second mobile phone device 601. In this case, the base station 604 sends the location information to the MTSO 610. A converted address in the MTSO 610 is then resent to the base station 604 and finally, the location information is delivered to the mobile phone device 602.

Figure 7:
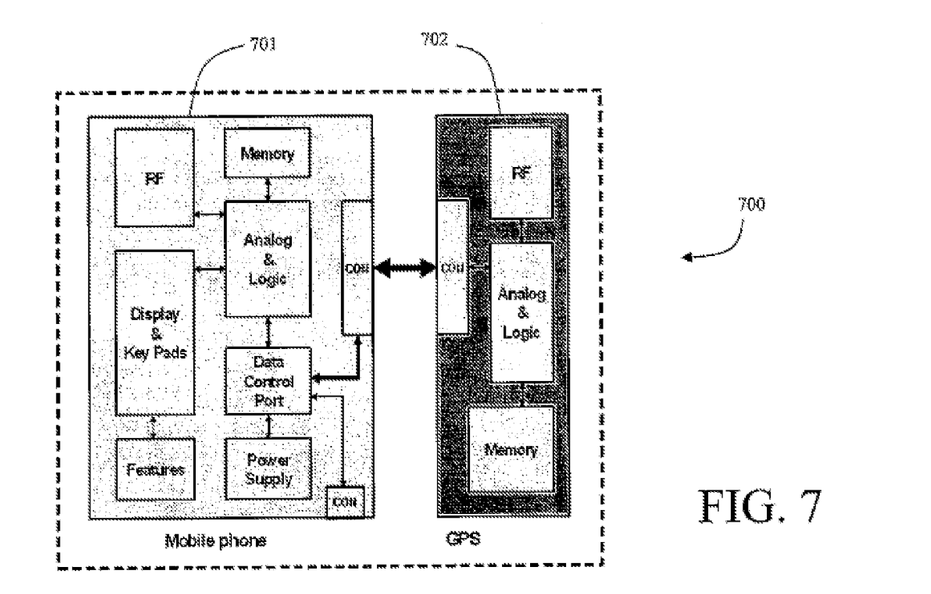
FIG. 7 depicts a schematic representation of a mobile phone in accordance with an embodiment of the present invention.

FIG. 7 depicts a schematic of a mobile phone 700 including typical components utilized in both a phone module 701 and a GPS module 702. The various component of the phone module 701 includes logic and hardware for receiving a location query from a base station, processing the query, and returning GPS data to the base station. The display and key pads provides an interface for setting the phone module 701 to either a reveal mode or a hidden mode, and optionally setting a password. Obviously, the specific configuration and implementation of the mobile phone 700 may vary.

Figure 8:
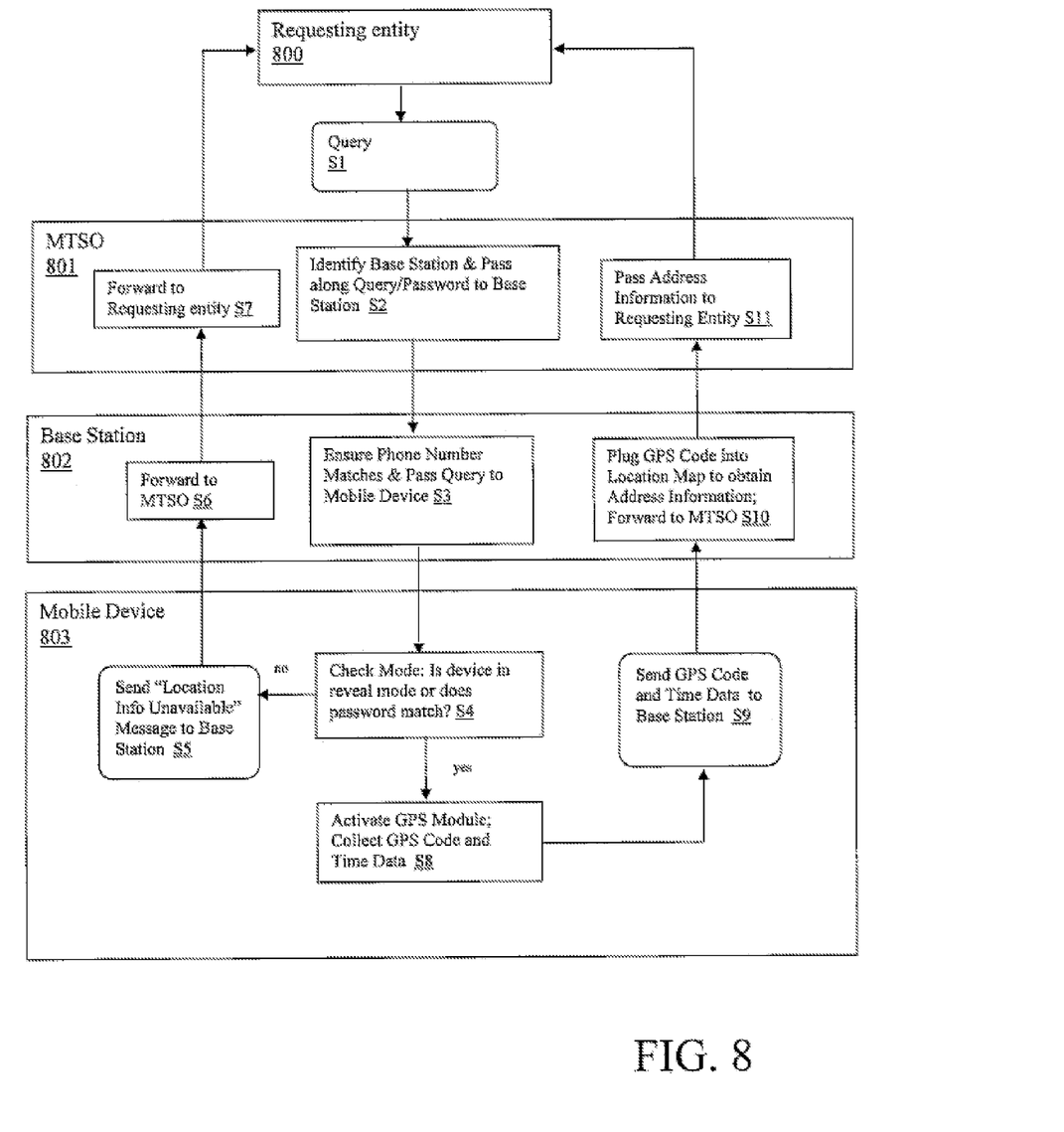
FIG. 8 depicts a flow diagram of a location process in accordance with an embodiment of the present invention.

FIG. 8 depicts a flow diagram showing the operation of the location-query procedure for locating a mobile telephone (i.e., mobile device 803) in a wireless network. First, a requesting entity 800 submits a query, comprised of a telephone number of the mobile device 803 and optionally a password, to MTSO 801 at step S1. Note that the requesting entity may typically comprise a user interfacing with a telephonic device that is associated with a telephone service provider. However, the requesting entity could comprise a user or automated system interfacing with any type of communication platform, such as a Website, Voice over IP system, cable network, etc.

When MTSO 801 receives the query, MTSO 801 identifies the base station 802 associated with the mobile device 803 by examining the telephone number submitted in the query, and then delivers the query to the associated base station 802 at step S2. At step S3, the base station 802 checks to make sure the phone number matches a device in the cell which belongs to the base station 802, and then passes the query to the mobile device 803.

At step S4, the mobile device 803 checks to see if either the device 802 is set to reveal mode or if a matching password was provided. If neither condition is met, then mobile device 803 sends a "Location Information Unavailable" message to the base station 802 at step S5. At step S6, the message is forwarded to the MTSO 801, and at step S7 the message is forwarded by the MTSO 801 to the requesting entity 800.

If one of the above conditions is met at step S4, then the GPS module is activated and GPS code and time data are collected at step S8. At step S9, the GPS code and time data are sent from the mobile device 803 to the base station 802. At step S10, the base station 802 plugs the GPS code into a location map or table to determine address information of the mobile device 803, which is then forwarded to the MTSO 801. Address information may comprise any type of location information, e.g., an address, a point on a map, etc. At step S11, the MTSO 801 passes the address information to the requesting entity 800.

It should be appreciated that the teachings of the present invention could be offered as a business method on a subscription or fee basis. For example, a system for locating mobile phone as described above could be created, maintained and/or deployed by a service provider that offers the functions described herein for customers. That is, a service provider could offer to deploy or provide the ability to locate mobile phones as described above.

It is understood that in addition to being implemented as a system and method, the features may be provided as a program product stored on a computer-readable medium, which when executed, enables a computer system to provide the features described above. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods, services and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A mobile phone location method comprising:
   receiving, by a mobile phone having a global positioning system (GPS) module, a location query including a request for a location of the mobile phone and a telephone number of the mobile phone, the location query originating from a third party device sent via a mobile telephone service operator (MTSO) and a base station with which the mobile phone is associated; and
   in a first mode of the mobile phone:
      determining using the mobile phone whether the location query includes a matching password;
      blocking GPS data from being sent by the mobile phone to the base station while maintaining functionality of the mobile phone in the case that the password of the location query not being a matching password; and
      sending with the mobile phone GPS data to the base station in the case that the password of the location query is a matching password.

2. The method of claim 1, wherein the third party device comprises a telephone.

3. The method of claim 1, wherein the third party device comprises a website.

4. The method of claim 1, further comprising, in a second mode of the mobile phone and responsive to the location query, sending with the mobile device GPS data.

5. A computer program product comprising program code on at least one computer readable storage device that, when executed by at least one computing device, implements a mobile phone location system on a mobile phone, the mobile phone including a global position system (GPS) module, the computer program product comprising program code configured to:
   receive by the mobile phone a location query from a third party device via a mobile telephone service operator (MTSO) and a base station associated with the mobile phone, wherein the location query includes at least a telephone number of the mobile phone;
   in a first mode in which the mobile phone blocks GPS data from being sent to the base station unless the location query includes a matching password while maintaining functionality of the mobile phone, determine, using the mobile phone, whether the location query includes a matching password and
   in the case that the password of the location query is determined to be a matching password, send, with the mobile phone, the GPS data, or, in the case that the password of the location query is determined not to be a matching password, block GPS data from being sent to the base station.

6. The computer program product of claim 5, wherein the third party device comprises a telephone.

7. The computer program product of claim 5, wherein the third party device comprises a website.

8. The computer program product of claim 5, wherein the program code is further configured to include a second mode of the mobile phone in which the mobile phone sends the GPS data responsive to the location query without the mobile phone determining whether the location query includes a matching password.

9. The computer program product of claim 5, wherein the program code is further configured to determine whether the mobile phone is in the first mode, and further including program code configured to enable the mobile phone to block the GPS data from being sent while maintaining functionality of the mobile phone.

10. The computer program product of claim 5, further comprising program code configured to convert the GPS data into an address.

11. The computer program product of claim 5, further comprising program code configured to convert the GPS data into a point on a map.

12. A mobile phone that is locatable within a wireless network, comprising:
   a global positioning system (GPS) module for obtaining GPS data;
   a mobile phone locating system configured to receive a location query from a third party via a base station;
   a first mode of the mobile phone in which the mobile phone maintains functionality while blocking GPS data from being sent by the mobile phone locating system to the third party unless the location query is determined by the mobile phone to include a matching password; and
   a second mode of the mobile phone in which the mobile phone will allow GPS data to be sent by the mobile phone locating system to the third party via the base station,
   wherein, in the first mode, the mobile phone is operable to:
      determine whether the location query includes a matching password;
      in the case that it is determined that the location query includes a matching password, send the GPS data to the base station; and
      in the case that it is determined that the location query does not include a matching password, block the GPS data from being sent to the base station.

13. The mobile phone of claim 12, further comprising an interface for selecting one of the first mode or the second mode.

14. The mobile phone of claim 12, further comprising an interface for setting a password of the mobile phone, wherein the password of the location query is a matching password when it matches the password as determined by the mobile phone.

15. The mobile phone of claim 12, wherein the GPS data includes a GPS code and a time.

16. The mobile phone of claim 12, wherein the GPS module is detachable from the mobile phone.

17. The mobile phone of claim 12, wherein the GPS module is integrated into the mobile phone.

* * * * *